W. D. Mann,

Accouterments.

No. 1,692. Reissued June 7, 1864.

Witnesses.
Charles Dubois
James H. Reilly.

Inventor.
W. D. Mann
By Munn & Co.
Attys

UNITED STATES PATENT OFFICE.

WILLIAM D. MANN, OF DETROIT, MICHIGAN.

IMPROVED MODE OF SLINGING ACCOUTERMENTS.

Specification forming part of Letters Patent No. 40,849, dated December 8, 1863; Reissue No. 1,692, dated June 7, 1864.

*To all whom it may concern:*

Be it known that I, WILLIAM D. MANN, of Detroit, in the county of Wayne and State of Michigan, have invented an Improvement in Soldiers' Accouterments; and I do hereby declare that the following is a full, clear, and exact description of the same, reference being had to the accompanying drawings, making a part of this specification, in which—

Figure 1:
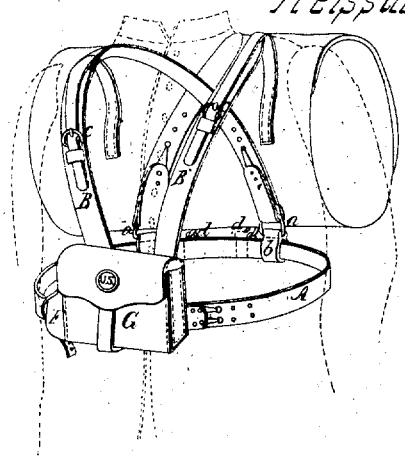
Figure 2:
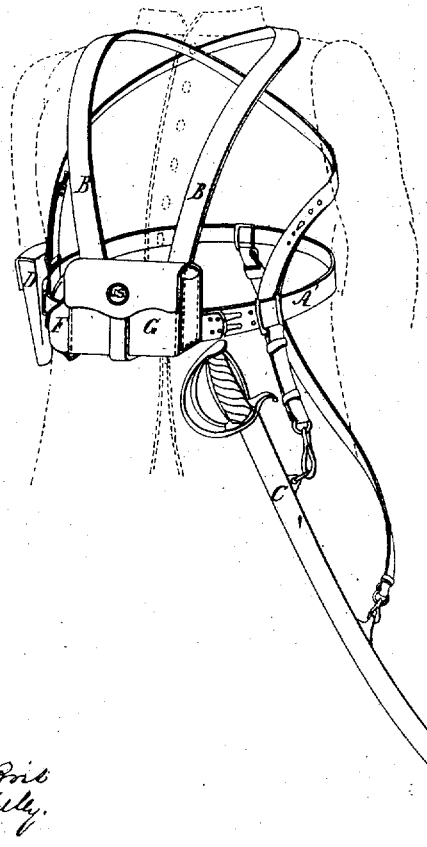

Figure 1 represents a perspective view of the manner of slinging the cartridge box and knapsack of an infantry soldier. Fig. 2 represents a similar view of the manner of slinging the cartridge-box, saber, and pistol of a cavalry soldier.

Similar letters of reference indicate corresponding parts in both figures of the drawings.

The principal object of this invention is to transfer the entire weight of the arms and accouterments of a cavalry soldier, usually worn upon the body, from the waist to the shoulders, for the purpose of lessening the tendency of such soldier to inflammation of the bowels, piles, hernia, and other diseases which result from wearing a tight belt around the waist, and at the same time enable him to carry a much larger quantity of ammunition than he possibly could do in the ordinary way; also, to relieve infantry soldiers from the pressure of the cartridge-box belt across the chest, and the cutting and galling of the knapsack-straps under the arms, as well as to transfer the weight of the knapsack, arms, accouterments, and equipments from the loins, bowels, and hollow of the back to his shoulders, and thus receive greater freedom of movement of the body and arms of the soldier.

To enable others skilled in the art to which my invention appertains to fully understand and use the same, I will proceed to describe it.

In the ordinary equipments of infantry soldiers the cartridge-box is sustained by a strap which passes from the box, which is hung on the right side of the body of the soldier near the hip, up across the breast, over the shoulder, and down across the back to the cartridge-box.

In my improvement I discard the strap altogether, and support the cartridge-box in the following manner:

Referring to the drawings, A is a body belt or strap, which encircles the waist of the soldier. B B are shoulder-straps, which cross each other on the soldier's back, but pass nearly straight down his breast toward the middle of belt A. Said straps are attached to the belt A behind by suitable rings or loops, *a b*, or other convenient fastenings; but in front said straps B B are attached to the cartridge-box G. The belts B B are attached to the back part of the cartridge-box G in such a manner as to have or form loops through which the belt A passes behind box G, and thus the belt A has both a front and back connection with the straps B B, so that the weight of any arms, accouterments, or other articles which may be attached either to the belt A or to the straps B B will be supported by the straps B B, and the said weights will fall upon or be sustained equally upon the tops of both shoulders of the soldier, and all other parts of his person will be substantially free from said weights.

In further carrying out my improvement the knapsack, which may be the ordinary kind, or otherwise constructed, (here represented by I,) has attached to it two short straps, J J, which are secured by any suitable fastenings to the inside of the knapsack. The said attached ends of straps J J are intended to be so made that they may be coupled or connected with the straps B B by buckles *c*, or other suitable fastening device upon the breast of the soldier, as shown in Fig. 1. Thus attached, the whole weight of the knapsack is sustained upon the shoulder-straps B B, which weight falls directly across the shoulders, and the location of the knapsack being at the back of the soldier, the cartridge-box being in front, and both being supported by the shoulder-straps B B, it follows that the weight of the cartridge-box and that of the knapsack counterbalance each other in the most favorable manner, and that the weight of both will fall evenly upon the top of the shoulders of the soldier.

To prevent the knapsack from flying up when the soldier is on the quick-march, I attach, in any suitable manner, to the lower part of the knapsack two short fly-straps, the ends of which may be coupled by any suitable fastening—such as buckles *d*—to the belt A.

The ordinary mode of slinging the knapsack is to have attached to it two pairs of straps, each pair of which buckles together and forms a loop through which the soldier passes his arms, and thus harnesses the knapsacks over his shoulders and under his armpits. These arm-loops are kept in place and connected in front upon the soldier's breast by two horizontal breast-straps which couple together. The pressure of these straps upon the breast is very fatiguing to the soldier, and is oftentimes the cause of injuries to the lungs. The use of the arm-loops and their constant presence and pressure under the armpits of the soldier encumbers the movement of his arms, wears his clothing, and produces sores and other diseases.

It will be observed that in my improvement I discard the arm-loops altogether, and also the horizontal breast-straps. The soldier whose knapsack is slung on my improved plan has the free use of his arms at all times, and carries his accouterments without any difficulties or impediments.

In the accouterment of cavalry soldiers the rear or crossing ends of the straps B B are spread farther apart than for the infantry soldier, being attached to the belt A, near the soldier's hips, at or near the place where the pistol-holder is suspended upon one side and the saber H upon the other side, as shown in Fig 2. The weight of both of the arms falls upon the belts B B on the back of the soldier, and said weight is counterbalanced by the weight of the cartridge-box in front, which is suspended in the manner hereinbefore described.

In the ordinary method of slinging cavalry arms and accouterments the principal weight of the saber, pistol, and ammunition is sustained by the body-belt. Consequently this must tightly fit the body, the effect of which is to prevent the free action of the respiratory organs, which is necessary to the general health of the soldier, and without which he cannot long expect to be able to perform military duty. The worst effect of the ordinary method of slinging cavalry accouterments, however, is the tendency it has to produce hernia, which always immediately unfits the soldier for military duty, and very often for any occupation.

By my mode of slinging the arms and accouterments of cavalry and infantry soldiers none of the evil effects above mentioned can obtain. The whole weight of the arms and accouterments is sustained by the shoulders, thus doing away with the necessity of wearing a tight body-belt, and permitting it to be worn as loose as may be desired; but aside from the benefits which inure to the soldier in a sanitary point of view, my invention is one of importance in a military point of view. The soldier is enabled to carry on his body at least double the quantity of ammunition in this way that he could possibly in any other. This feature of my invention alone is of special importance to cavalry soldiers who are armed with what is known as "repeating rifles." These arms use up a large quantity of ammunition in a short time, and unless some way is provided whereby they can be easily and quickly replenished with charges they are of little more use than the ordinary breech-loading carbines.

Another feature of my invention, but which I make no claim to here, is the attachment of the cap-box to one side of the cartridge-box. This is shown clearly in both figures of the drawings, in which F represents the cap-box, and G the cartridge box, the former being attached to the latter by sewing or otherwise. In this position of the cap-box the caps are more accessible than when the box is hung on the belt in the usual manner.

Having thus described my invention, I claim as new and desire to secure by Letters Patent—

1. So arranging the slinging attachments, accouterments, and equipments of infantry or cavalry soldiers that when in use the weight of the cartridge-box will be counterbalanced by the other accouterments and equipments or arms usually worn upon the body, and the weight of the whole borne upon the shoulders, substantially as described.

2. The combination of the shoulder-straps B B with the belt-strap A, whether for infantry or cavalry equipment, substantially in the manner and for the purpose herein shown and described.

3. The combination of shoulder-straps B B with the cartridge-box G, substantially in the manner and for the purpose herein shown and described.

4. The attachment of the knapsack to the shoulder-straps B B, substantially in the manner and for the purpose herein shown and described.

5. The slinging-straps J J, attached to the knapsack, substantially in the manner and for the purpose herein shown and described.

6. The fly-straps attached to the lower part of the knapsack, substantially as and for the purpose herein shown and described.

W. D. MANN.

Witnesses:
M. M. LIVINGSTON,
JAMES P. HALL.